US010789363B1

(12) United States Patent
Gursoy et al.

(10) Patent No.: US 10,789,363 B1
(45) Date of Patent: Sep. 29, 2020

(54) IDENTIFYING AND PROTECTING AGAINST COMPUTER SECURITY THREATS WHILE PRESERVING PRIVACY OF INDIVIDUAL CLIENT DEVICES USING CONDENSED LOCAL DIFFERENTIAL PRIVACY (CLDP)

(71) Applicant: SYMANTEC CORPORATION, Mountain View, CA (US)

(72) Inventors: Mehmet Emre Gursoy, Atlanta, GA (US); Acar Tamersoy, Culver City, CA (US)

(73) Assignee: NORTONLIFELOCK INC., Tempe, AZ (US)

( * ) Notice: Subject to any disclaimer, the term of this patent is extended or adjusted under 35 U.S.C. 154(b) by 189 days.

(21) Appl. No.: 16/146,189

(22) Filed: Sep. 28, 2018

(51) Int. Cl.
| | | |
|---|---|---|
| *G06F 21/00* | (2013.01) |
| *G06F 21/56* | (2013.01) |
| *G06F 21/62* | (2013.01) |
| *G06F 21/55* | (2013.01) |

(52) U.S. Cl.
CPC .......... *G06F 21/567* (2013.01); *G06F 21/554* (2013.01); *G06F 21/566* (2013.01); *G06F 21/6254* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 9,594,741 B1 | 3/2017 | Thakurta et al. | |
| 9,705,908 B1 | 7/2017 | Thakurta et al. | |
| 10,133,725 B2 * | 11/2018 | Thakurta | G06F 16/374 |
| 10,154,054 B2 * | 12/2018 | Thakurta | H04L 63/1425 |
| 10,229,282 B2 * | 3/2019 | Sierra | H04L 9/0631 |
| 10,599,868 B2 * | 3/2020 | Barraclough | G06F 1/28 |
| 2018/0349384 A1 * | 12/2018 | Nerurkar | G06F 16/2465 |

OTHER PUBLICATIONS

C. Dwork, "Differential privacy," in International Colloquium on Automata, Languages, and Programming. Springer, 2006, pp. 1-12.
(Continued)

*Primary Examiner* — Andrew J Steinle
(74) *Attorney, Agent, or Firm* — Maschoff Brennan

(57) ABSTRACT

Identifying and protecting against computer security threats while preserving privacy of individual client devices using condensed local differential privacy (CLDP). In one embodiment, a method may include mapping non-ordinal data values to ordinal data values, generating a first ordering scheme for the ordinal data values, accessing actual non-ordinal data values, converting the actual non-ordinal data values to actual ordinal data values according to the mapping, generating first perturbed ordinal data values by adding noise, and aggregating the first perturbed ordinal data values. The method may also include generating a second ordering scheme for the ordinal data values by denoising and refining the aggregated first perturbed ordinal data values, generating second perturbed ordinal data values by adding noise, aggregating the second perturbed ordinal data values, analyzing the aggregated second perturbed ordinal data values to identify a computer security threat, and in response, thwarting the computer security threat.

20 Claims, 7 Drawing Sheets

(56) References Cited

OTHER PUBLICATIONS

C. Dwork, A. Roth et al., "The algorithmic foundations of differential privacy," Foundations and Trends in Theoretical Computer Science, vol. 9, No. 3-4, pp. 211-407, 2014.
N. Li, M. Lyu, D. Su, and W. Yang, "Differential privacy: From theory to practice," Synthesis Lectures on Information Security, Privacy, & Trust, vol. 8, No. 4, pp. 1-138, 2016.
J. C. Duchi, M. I. Jordan, and M. J. Wainwright, "Local privacy and statistical minimax rates," in 2013 IEEE 54th Annual Symposium on Foundations of Computer Science (FOCS). IEEE, 2013, pp. 429-438.
P. Kairouz, S. Oh, and P. Viswanath, "Extremal mechanisms for local differential privacy," in Advances in Neural Information Processing Systems, 2014, pp. 2879-2887.
R. Bassily and A. Smith, "Local, private, efficient protocols for succinct histograms," in Proceedings of the 47th Annual ACM Symposium on Theory of Computing. ACM, 2015, pp. 127-135.
A. Smith, A. Thakurta, and J. Upadhyay, "Is interaction necessary for distributed private learning?" in 2017 IEEE Symposium on Security and Privacy (SP). IEEE, 2017, pp. 58-77.
M. Bun, J. Nelson, and U. Stemmer, "Heavy hitters and the structure of local privacy," in Proceedings of the 35th ACM SIGMOD-SIGACT-SIGAI Symposium on Principles of Database Systems. ACM, 2018, pp. 435-447.
Z. Qin, Y. Yang, T. Yu, I. Khalil, X. Xiao, and K. Ren, "Heavy hitter estimation over set-valued data with local differential privacy," in Proceedings of the 2016 ACM SIGSAC Conference on Computer and Communications Security. ACM, 2016, pp. 192-203.
T. Wang, N. Li, and S. Jha, "Locally differentially private frequent itemset mining," in IEEE Symposium on Security and Privacy (SP). IEEE, 2018.
G. Cormode, T. Kulkarni, and D. Srivastava, "Marginal release under local differential privacy," in Proceedings of the 2018 International Conference on Management of Data. ACM, 2018, pp. 131-146.
Z. Zhang, T. Wang, N. Li, S. He, and J. Chen, "Calm: Consistent adaptive local marginal for marginal release under local differential privacy," in Proceedings of the 2018 ACM SIGSAC Conference on Computer and Communications Security. ACM, 2018, pp. 212-229.
R. Chen, H. Li, A. Qin, S. P. Kasiviswanathan, and H. Jin, "Private spatial data aggregation in the local setting," in 2016 IEEE 32nd International Conference on Data Engineering (ICDE). IEEE, 2016, pp. 289-300.
Q. Ye, H. Hu, X. Meng, and H. Zheng, "Privkv: Key-value data collection with local differential privacy," in IEEE Symposium on Security and Privacy (SP). IEEE, 2019.
N. Wang, X. Xiao, Y. Yang, T. D. Hoang, H. Shin, J. Shin, and G. Yu, "Privtrie: Effective frequent term discovery under local differential privacy," in IEEE International Conference on Data Engineering (ICDE), 2018.
M. Andres, N. Bordenabe, K. Chatzikokolakis, and C. Palamidessi, "Geo-indistinguishability: Differential privacy for location-based systems," in Proceedings of the 2013 ACM SIGSAC Conference on Computer and Communications Security. ACM, 2013, pp. 901-914.
N. Bordenabe, K. Chatzikokolakis, and C. Palamidessi, "Optimal geo-indistinguishable mechanisms for location privacy," in Proceedings of the 2014 ACM SIGSAC Conference on Computer and Communications Security. ACM, 2014, pp. 251-262.
K. Chatzikokolakis, M. E. Andres, N. E. Bordenabe, and C. Palamidessi, "Broadening the scope of differential privacy using metrics," in International Symposium on Privacy Enhancing Technologies (PETS). Springer, 2013, pp. 82-102.
M. Hay, C. Li, G. Miklau, and D. Jensen, "Accurate estimation of the degree distribution of private networks," in 9th IEEE International Conference on Data Mining (ICDM). IEEE, 2009, pp. 169-178.
U.S. Appl. No. 16/146,217, titled Identifying and Protecting Against Computer Security Threats While Preserving Privacy of Individual Client Devices Using Condensed Local Differenial Privacy (CLDP); filed Sep. 28, 2018; 39 pages.
Apple, Inc.; "Differential Privacy"; white paper; located at: 1. https://www.apple.com/privacy/docs/Differential_Privacy_Overview.pdf; accessed on Sep. 27, 2018; 3 pages.
Fanti et al.; "Building a RAPPOR with Unknown: Privacy-Preserving Learning of Associations and Data Dictionaries"; presented at the Proceedings on Privacy Enhancing Technologies; 2016; 21 pages.
Ding et al.; "Collecting Telemetry Data Privately"; presented at the 31st Conference on Neutral Information Processing Systems (NIPS 2017); 16 pages.
Bittau et al.; "PROCHLO: Strong Privacy for Analytics in the Crowd"; presented at the SOSP on Oct. 28, 2017 in Shanghai, China; 19 pages.
Erlingsson et al.; "Rappor: Randomized Aggregatable Privacy-Preserving Ordinal Response"; Presented at the CCS'14 on Nov. 3-7, 2014 in Scottsdale, Arizona; 14 pages.
Wang et al.; "Locally Differentially Private Protocols for Frequency Estimation"; presented at the 26th USENIX Security Symposium on Aug. 16-18, 2017 in Vancouver, BC, Canada; 19 pages.
Apple, Inc.; "Learning with Privacy at Scale"; white paper; located at: https://machinelearning.apple.com/docs/learning-with-privacy-at-scale/appledifferentialprivacysystem.pdf; accessed on Sep. 27, 2018; 25 pages.
Qin et al.; "Generating Synthetic Decentralized Social Graphs with Local Differential Privacy"; Presented at the CCS'14 on Oct. 30-Nov. 3, 2014 in Dallas, Texas; 14 pages.

* cited by examiner

IDENTIFYING AND PROTECTING AGAINST COMPUTER SECURITY THREATS WHILE PRESERVING PRIVACY OF INDIVIDUAL CLIENT DEVICES USING CONDENSED LOCAL DIFFERENTIAL PRIVACY (CLDP)

BACKGROUND

Modern computers and computer networks are subject to a variety of security threats. For example, malware is software intentionally designed to cause damage to a computer or computer network. Malware typically does damage after it infects a targeted computer. A malware outbreak occurs when malware infects multiple computers. Unfortunately, it can be difficult to diagnose a malware outbreak in order to limit or prevent damage from the malware.

One method for diagnosing a malware outbreak involves a security company collecting and analyzing data from their clients' computers. Although a security company may benefit from collecting this data from their clients' computers, some clients may object to this collection of data as an invasion of privacy.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for identifying and protecting against computer security threats while preserving privacy of individual client devices using condensed local differential privacy (CLDP) may be performed, at least in part, by a computer device including at least one processor. The method may include mapping, at a remote server device, non-ordinal data values to ordinal data values. The method may also include generating, at the remote server device, a first ordering scheme for the ordinal data values. The method may further include sending, to local client devices, the mapping and the first ordering scheme. The method may also include accessing, at each of the local client devices, an actual non-ordinal data value. The method may further include converting, at each of the local client devices, the actual non-ordinal data value to an actual ordinal data value according to the mapping. The method may also include generating, at each of the local client devices, a first perturbed ordinal data value by adding noise to the actual ordinal data value. An amount of noise added, according to the first ordering scheme, to each actual data value may be probabilistically computed such that a probability of noise being added decreases as an amount of added noise increases. The method may further include sending, from each of the local client devices, the first perturbed ordinal data value to the remote server device. The method may also include aggregating, at the remote server device, the first perturbed ordinal data values to at least partially cancel out aggregate noise of the aggregated first perturbed ordinal data values at a population level. The method may further include generating, at the remote server device, a second ordering scheme for the ordinal data values by denoising and refining the aggregated first perturbed ordinal data values. The method may also include sending, to local client devices, the second ordering scheme. The method may further include generating, at each of the local client devices, a second perturbed ordinal data value by adding noise to the actual ordinal data value. An amount of noise added, according to the second ordering scheme, to each actual data value may be probabilistically computed such that a probability of noise being added decreases as an amount of added noise increases. The method may also include sending, from each of the local client devices, the second perturbed ordinal data value to the remote server device. The method may further include aggregating, at the remote server device, the second perturbed ordinal data values to at least partially cancel out aggregate noise of the aggregated second perturbed ordinal data values at a population level. The method may also include analyzing, at the remote server device, using CLDP, the aggregated second perturbed ordinal data values to identify a computer security threat to the local client devices while preserving privacy of the actual data values by preventing the remote server device from inferring the actual data value of any of the local client devices. The method may further include, in response to identifying the computer security threat, protecting against the computer security threat by performing, at one or more of the local client devices, a remedial action to protect the one or more local client devices from the computer security threat.

In some embodiments, the analyzing may be performed on the aggregated second perturbed ordinal data values after the aggregated second perturbed ordinal data values have been reverse-mapped to perturbed non-ordinal data values using the mapping.

In some embodiments, the performing, at the one or more local client devices, of the remedial action may include one or more of blocking the one or more local client devices from accessing a network, rolling back one or more changes at the one or more local client devices that were made in response to the computer security threat, or temporarily freezing activity at the one or more local client devices, or some combination thereof.

In some embodiments, the noise may be added to each actual ordinal data value with a probability of noise being added decreasing exponentially as an amount of added noise increases.

In some embodiments, the computer security threat may include a malware outbreak. In these embodiments, the actual non-ordinal data values may include names of the operating systems being executed on the local client devices. In these embodiments, the adding of the noise to the actual ordinal data values may prevent the remote server device from inferring the name of the operating system being executed on any of the local client devices. Additionally or alternatively, in these embodiments, the analyzing may include analyzing, at the remote server device, using CLDP, the aggregated perturbed ordinal data values to identify a timing of a malware infecting the local client devices.

In some embodiments, the method may further include accessing, at each of the local client devices, a sequence of actual non-ordinal data values. In these embodiments, the method may also include generating, at each of the local client devices, a sequence of perturbed non-ordinal data values by adding noise to one or more of the actual data values in the sequence of actual non-ordinal data values. The amount of noise added, according to the mapping and the second ordering scheme, to each actual data value may be probabilistically computed such that a probability of noise being added decreases as an amount of added noise increases. In these embodiments, the method may further include sending, from each of the local client devices, the sequence of perturbed non-ordinal data values to the remote server device. In these embodiments, the method may also include aggregating, at the remote server device, the sequences of perturbed non-ordinal data values to at least partially cancel out aggregate noise of the aggregated sequences of perturbed non-ordinal data values at a population level. In these embodiments, the method may further include analyzing, at the remote server device, using CLDP, the aggregated sequences of perturbed non-ordinal data values to identify a second computer security threat to the local client devices while preserving privacy of the sequences of actual non-ordinal data values by preventing the remote server device from inferring the sequence of actual non-ordinal data values, and an actual length of the sequence of actual non-ordinal data values, of any of the local client devices. In these embodiments, the method may also include, in response to identifying the second computer security threat, protecting against the second computer security threat by performing, at one or more of the local client devices, a second remedial action to protect the one or more local client devices from the second computer security threat.

Further, in some embodiments, one or more non-transitory computer-readable media may include one or more computer-readable instructions that, when executed by one or more processors of a computer device, cause the computer device to perform a method for identifying and protecting against computer security threats while preserving privacy of individual client devices using CLDP.

Also, in some embodiments, a remote server device may include one or more processors and one or more non-transitory computer-readable media including one or more computer-readable instructions that, when executed by the one or more processors, cause the remote server device to perform a method for identifying and protecting against computer security threats while preserving privacy of individual client devices using CLDP.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Figure 1:
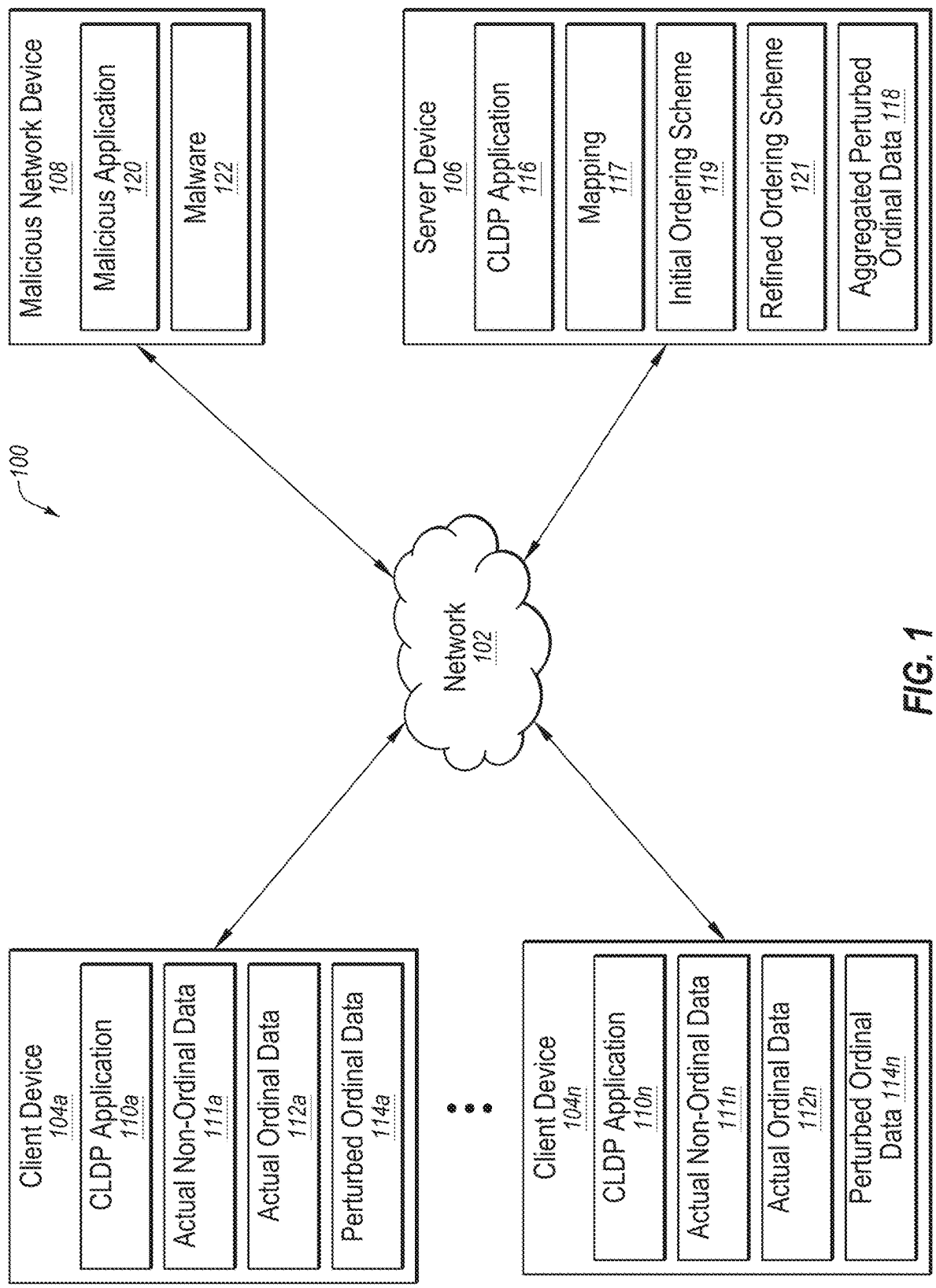
FIG. 1 illustrates an example system configured for identifying and protecting against computer security threats, while preserving privacy of individual client devices, using condensed local differential privacy (CLDP) for single non-ordinal data values or for sequences of non-ordinal data values.

Security threats to computers and computer networks can be difficult to diagnose. For example, when a malware outbreak occurs due to malware infecting multiple computers, it can be difficult to diagnose the malware outbreak in order to limit or prevent damage from the malware. One method employed to diagnose a malware outbreak involves a security company collecting data from their clients' computers. However, some clients object to this collection of data as an invasion of privacy. For example, a client may object to sharing the exact number of malware infections experienced by each of its computers for fear that this data may be embarrassing if obtained by competitors or customers. Additionally or alternatively, a client may object to sharing the exact number of malware infections experienced by each of its computers for fear that purveyors of the malware may obtain this data and use it to execute future malware attacks on the client. Therefore, although a security company may benefit from the collection of data from its clients' computers, the clients may feel that this collection of potentially sensitive data intrudes upon their privacy, and as such, they may not be comfortable with opting-in to this data collection unless their privacy can be protected.

One method a security company may employ to collect client data while offering some level of privacy guarantee to the client involves using local differential privacy (LDP). Using LDP, each client locally perturbs or randomizes their actual data, and shares the perturbed version of their actual data with the security company. After observing a client's perturbed data, the security company may not be able to infer or reverse-engineer the client's actual data with strong confidence. Nevertheless, over large populations, the impact of perturbation and randomization may be expected to cancel out after the clients' perturbed or randomized data is aggregated, and therefore an analysis of the aggregated perturbed or randomized data may be able accurately to estimate aggregate statistics and trends pertaining to the whole population.

Unfortunately, however, some LDP methods require collecting data from relatively large populations (e.g., on the order of millions of data values) to derive accurate insights. The requirement for relatively large user populations greatly hinders the practicality of LDP in many applications, since relatively large populations are not always available. For example, when attempting to diagnose a malware outbreak, there may be only a relatively small number (e.g., on the order of only thousands of client devices) of computers around the world infected by a particular malware. Therefore, for this relatively small population, the impact of some LDP methods' perturbing or randomizing will not cancel out, resulting in aggregate statistics that are too noisy to be used in accurately estimating aggregate statistics and trends pertaining to the whole population.

Further, some LDP methods require collecting ordinal data. The requirement for the collection of ordinal data may hinder the practicality of LDP in many applications, since some applications require analysis of non-ordinal data such as textual data or sequences of textual data. For example, when attempting to diagnose a malware outbreak, one type of data that may be collected and analyzed may be the names of the operating systems being executed on computers around the world infected by a particular malware. Therefore, because the name of an operating system is a textual data value, and is therefore a non-ordinal data value, some LDP methods that require collecting ordinal data values may not be capable of analyzing the collected textual data values, resulting in aggregate statistics that cannot be analyzed for the whole population. In another example, when attempting to diagnose a malware outbreak, another type of data that may be collected and analyzed may be the sequences of events that occurred on computers around the world just prior to infection or just after infection by a particular malware. Therefore, because the sequence of events that occurs on a computer is a sequence of textual data, and therefore is non-ordinal data, some LDP methods that require collecting ordinal data may not be capable of analyzing the collected sequences of events, resulting in aggregate statistics that cannot be analyzed for the whole population.

Thus, some LDP methods may fail to be useful in accurately diagnosing a malware outbreak, resulting in damage to computers infected in the malware outbreak.

The embodiments disclosed herein may provide various benefits. In particular, the embodiments disclosed herein may, for example, enable identifying and protecting against computer security threats, while preserving privacy of individual client devices, using condensed local differential privacy (CLDP) for single non-ordinal data values or for sequences of non-ordinal data values. In some embodiments, a CLDP application at a remote server device may map non-ordinal data values to ordinal data values, may generate a first ordering scheme for the ordinal data values, and may send the mapping and the first ordering scheme to local client devices. CLDP applications at the local client devices may then access, at the local client devices, actual non-ordinal data values, convert the actual non-ordinal data values to actual ordinal data values according to the mapping, and generate first perturbed ordinal data values by adding noise to the actual ordinal data values. The CLDP applications may probabilistically compute the noise and then add the noise, according to the first ordering scheme, to the actual ordinal data values at each of the local client devices such that a probability of noise being added decreases as an amount of added noise increases. The CLDP applications may then send the first perturbed ordinal data values to the remote server device. The first perturbed ordinal data values may preserve privacy of the actual ordinal data values by preventing the remote server device from inferring the actual ordinal data value of any of the local client devices. The CLDP application at the remote server device may aggregate, at the remote server device, the first perturbed ordinal data values to at least partially cancel out aggregate noise of the aggregated first perturbed ordinal data values at a population level. Then, the CLDP applications may repeat certain actions to improve accuracy. For example, the CLDP application may generate, at the remote server device, a second ordering scheme for the ordinal data values by denoising and refining the aggregated first perturbed ordinal data values, and may then send the second ordering scheme to local client devices. The CLDP applications at the local client devices may then generate, at the local client devices, second perturbed ordinal data values by adding noise to the actual ordinal data values, and then send, from the local client devices, the second perturbed ordinal data values to the remote server device. The CLDP application at the remote server device may then aggregate, at the remote server device, the second perturbed ordinal data values to at least partially cancel out aggregate noise of the aggregated second perturbed ordinal data values at a population level, and then analyze, at the remote server device, the aggregated second perturbed ordinal data values (perhaps after the aggregated perturbed ordinal data values have been reverse-mapped to perturbed non-ordinal data values using the mapping) to identify a computer security threat. Then, in response, the CLDP application may protect against the computer security threat by performing, at one or more of the local client devices, a remedial action to protect the one or more local client devices from the computer security threat.

Also, in some embodiments, the CLDP applications at each of the local client devices may also be able to handle sequences of actual non-ordinal data values. In these embodiments, the CLDP applications at the local client devices may access, at each of the local client devices, a sequence of actual non-ordinal data values, and then generate, at each of the local client devices, a sequence of perturbed non-ordinal data values by adding noise to one or more of the actual data values in the sequence of actual non-ordinal data values. The amount of noise added, according to the mapping and the second ordering scheme (the generation of which are discussed above), to each actual data value may be probabilistically computed such that a probability of noise being added decreases as an amount of added noise increases. The CLDP applications may then send, from each of the local client devices, the sequence of perturbed non-ordinal data values to the remote server device. The CLDP application at the remote server device may then aggregate, at the remote server device, the sequences of perturbed non-ordinal data values to at least partially cancel out aggregate noise of the aggregated sequences of perturbed non-ordinal data values at a population level. The CLDP application at the remote server device may then analyze, at the remote server device, using CLDP, the aggregated sequences of perturbed non-ordinal data values to identify a second computer security threat to the local client devices while preserving privacy of the sequences of actual non-ordinal data values by preventing the remote server device from inferring the sequence of actual non-ordinal data values, and an actual length of the sequence of actual non-ordinal data values, of any of the local client devices. Then, in response, the CLDP application may protect against the second computer security threat by performing, at one or more of the local client devices, a second remedial action to protect the one or more local client devices from the second computer security threat.

Some embodiments disclosed herein are thus able to identify and protect against computer security threats, while preserving privacy of individual client devices, using CLDP for single non-ordinal data values or for sequences of non-ordinal data values. Unlike some LDP methods which require collecting data from relatively large populations (e.g., on the order of millions of data values) to derive accurate insights, the CLDP methods disclosed herein may be employed on relatively small populations (e.g., on the order of only thousands of client devices) and still derive accurate insights. For example, when attempting to diagnose a malware outbreak, the CLDP methods disclosed herein may aggregate perturbed ordinal data values from only a relatively small number of computers around the world infected by a particular malware, and yet the perturbing of the actual data value can still be cancelled out, resulting in aggregate statistics that reduce noise sufficiently to be used in accurately estimating aggregate statistics and trends pertaining to the whole population.

Further, unlike some LDP methods which cannot handle sequences of non-ordinal data values, the CLDP method disclosed herein may be employed to collect sequences of non-ordinal data such as sequences of textual data. For example, when attempting to diagnose a malware outbreak, the CLDP method disclosed herein may collect and analyze the sequences of events that occurred on computers around the world just prior to infection or just after infection by a particular malware, even though the sequence of events that occurs on a computer is a sequence of non-ordinal data.

Thus, the CLDP methods disclosed herein may be employed to accurately diagnose a malware outbreak, resulting in the minimizing or preventing of damage to computers infected in the malware outbreak and/or the avoiding of infections of additional computers.

Although some embodiments of the CLDP methods are disclosed herein as being employed in connection with identifying and protecting against a malware outbreak, it is understood that a malware outbreak is only one of countless practical applications for the CLDP methods disclosed herein. For example, the CLDP methods disclosed herein may be employed in other practical applications where it is desirable to collect and aggregate ordinal data in a privacy-preserving manner in order to entice clients to be willing to opt-in to data collection. These applications may include, but are not limited to, a security company gathering sensitive data from its clients such as device statistics, server logs, product telemetry, and other various security-related information. Therefore, the CLDP methods disclosed herein are not limited to being employed in connection with identifying and protecting against a malware outbreak, but may also or instead be employed in any other practical application.

As used herein, the term "ordinal data value" refers to a data value with a data type that stems from a finite metric space, such as where the item universe U is discrete and well-defined, and there exists a built-in distance function d: $U \times U \rightarrow [0, infinity]$ satisfying the conditions of being a metric. This setting covers a variety of useful data types in practice: (i) discrete numeric or integer domains where d can be the absolute value distance between two items, (ii) ordinal item domains with total order, e.g., letters and strings ordered by alphabet dictionary order A<B<C, and (iii) categorical domains with tree-structured domain taxonomy where distance between two items can be measured using the depth of their most recent common ancestor in the taxonomy tree. As used herein, the term "non-ordinal data value" refers to any data value that is not an ordinal data value.

Turning to the figures, FIG. 1 illustrates an example system 100 configured for identifying and protecting against computer security threats, while preserving privacy of individual client devices, using CLDP for single non-ordinal data values or for sequences of non-ordinal data values. The system 100 may include a network 102, client devices 104a-104n, a server device 106, and a malicious network device 108.

In some embodiments, the network 102 may be configured to communicatively couple the client devices 104a-104n, the server device 106, and the malicious network device 108 to one another as well as to other network devices and other networks. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), or some combination thereof. In some embodiments, the network 102 may also be coupled to, or may include, portions of a telecommunications network, including telephone lines, for sending data in a variety of different communication protocols, such as a cellular network or a Voice over IP (VoIP) network.

Figure 6:
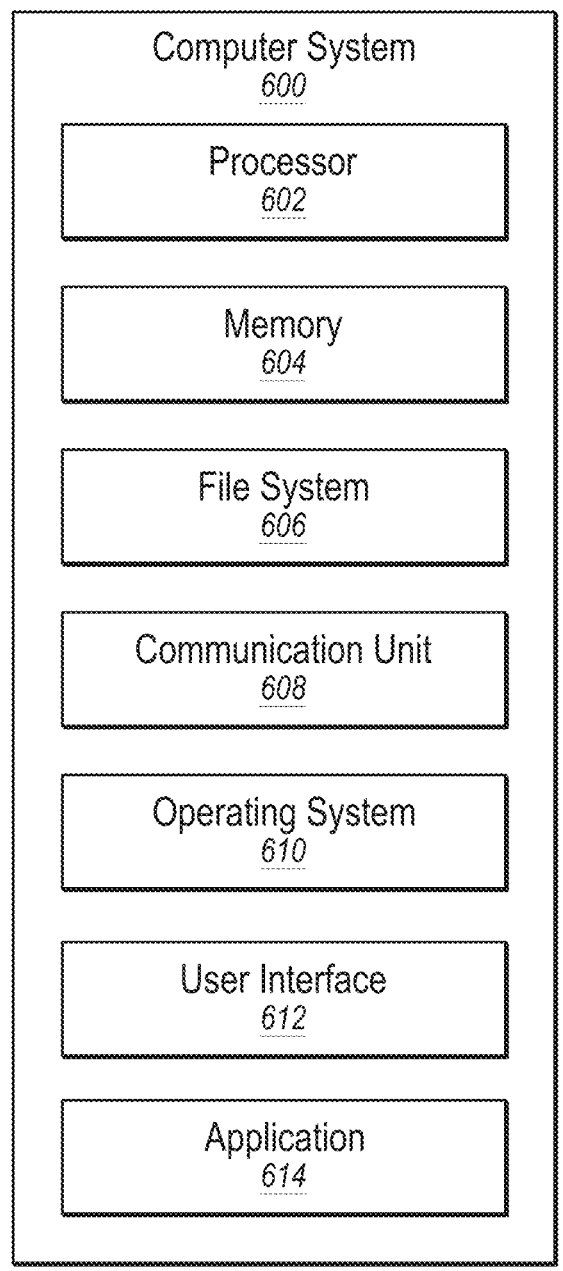
FIG. 6 illustrates an example computer system that may be employed in identifying and protecting against computer security threats, while preserving privacy of individual client devices, using CLDP for single non-ordinal data values or for sequences of non-ordinal data values.

In some embodiments, the malicious network device 108 may be any computer system capable of communicating over the network 102 and capable of executing a malicious application 120 that attempts to infect other network devices with malware 122, examples of which are disclosed herein in connection with the computer system 600 of FIG. 6. In some embodiments, the malware 122 may be, or may include the functionality of, one or more of a spyware, a virus, a worm, a logic bomb, a trapdoor, a Trojan horse, a Remote Admin Trojan (RAT), a mobile malicious code, a malicious font, and a rootkit. When the malicious application 120 is able to infect multiple network devices with the malware 122, the malicious application 120 has achieved an outbreak of the malware 122.

In some embodiments, each of the client devices 104a-104n may be any computer system capable of communicating over the network 102 and capable of executing a CLDP application, examples of which are disclosed herein in connection with the computer system 600 of FIG. 6. The client devices 104a-104n may include CLDP applications 110a-110n, respectively. The CLDP applications 110a-110n may be configured to implement one or more actions of the CLDP methods disclosed herein. For example, the CLDP applications 110a-110n may be configured to access actual non-ordinal data 111a-111n, convert the actual non-ordinal data 111a-111n to actual ordinal data 112a-112n (according to a mapping 117 received from the server device 106, for example), and then generate perturbed ordinal data 114a-114n by adding noise to the actual ordinal data 112a-112n.

In some embodiments, the actual non-ordinal data 111a-111n may relate to an outbreak of the malware 122 which is maliciously disseminated by the malicious application 120 executing on the malicious network device 108. For example, the actual non-ordinal data 111a-111n may be textual data such as the names of the operating systems being executed on the client devices 104a-104n. In this example, when the CLDP applications 110a-110n add noise to the actual ordinal data 112a-112n, the adding of noise may include modifying the actual ordinal data 112a-112n to which the actual non-ordinal data 111a-111n was mapped to prevent the server device 106 from inferring the name of the operating system being executed on any of the client devices 104a-104n. In another example, a sequence of actual non-ordinal data may be accessed at each of the client devices 104a-104n, such as a sequence of events that occurred on each of the client devices 104a-104n just prior to or just after infection by the malware 122. In this example, when the CLDP applications 110a-110n add noise to the sequences of actual non-ordinal data, the adding of noise may include modifying the sequences of actual non-ordinal data to prevent the server device 106 from inferring the sequence of actual non-ordinal data values, and an actual length of the sequence of actual non-ordinal data values, of any of the local client devices 104a-104n.

In some embodiments, the server device 106 may be any computer system capable of communicating over the network 102 and capable of executing a CLDP application 116, examples of which are disclosed herein in connection with the computer system 600 of FIG. 6. The CLDP application 116 may be configured to implement one or more actions of the CLDP methods disclosed herein. For example, the CLDP application 116 may be configured to map non-ordinal data to ordinal data in a mapping 117, generate an initial ordering scheme 119 for the ordinal data, and send the mapping 117 and the initial ordering scheme 119 to the client devices 104a-104n. Then, the CLDP application 116 may be configured to receive the perturbed ordinal data 114a-114n from the client devices 104a-104n, and then aggregate the perturbed ordinal data 114a-114n into aggregated perturbed ordinal data 118 to at least partially cancel out aggregate noise at a population level that was added to the actual ordinal data 112a-112n. Then, in some embodiments, some actions may be repeated to improve accuracy. For example, the CLDP application 116 may be configured to generate a refined ordering scheme 121 for the ordinal data by denoising and refining the aggregated perturbed ordinal data 118, and then send the refined ordering scheme 121 to the client devices 104a-104n, where the refined ordering scheme 121 can be employed in generating a second round of perturbed ordinal data 114a-114n, which is received and aggregated into the aggregated perturbed ordinal data 118. This repeating of some actions may be desirable due to a first round of these actions not being entirely successful at determining accurate frequency values, but being relatively successful at determining accurate frequency rankings. Therefore, by generating the refined ordering scheme 121 using the relatively accurate frequency rankings, a second round of these actions may be more successful at determining accurate frequency values. The CLDP application 116 may then analyze the aggregated perturbed ordinal data 118 (perhaps after the aggregated perturbed ordinal data 118 has been reverse-mapped to perturbed non-ordinal data using the mapping 117) to identify an outbreak of the malware 122 on the client devices 104a-104n and then protect against the outbreak of the malware 122 by performing a remedial action to protect one or more of the client devices 104a-104n from the outbreak of the malware 122. This remedial action may include, for example, blocking one or more of the client devices 104a-104n from accessing the network 102, rolling back one or more changes at one or more of the client devices 104a-104n that were made in response to the outbreak of the malware 122 (e.g., one or more changes made by the malware 122), or temporarily freezing activity at one or more of the client devices 104a-104n, or some combination thereof.

Therefore, the CLDP applications 110a-110n and 116 may cooperate to identify and protect against an outbreak of the malware 122, while preserving privacy of the individual client devices 104a-104n, using CLDP for single non-ordinal data values or for sequences of non-ordinal data values. Unlike some LDP methods which require collecting data from relatively large populations (e.g., on the order of millions of client devices) to derive accurate insights, the CLDP applications 110a-110n and 116 may employ the CLDP methods disclosed herein on the relatively small population of the client devices 104a-104n (e.g., on the order of only thousands of client devices) and still derive accurate insights. For example, when attempting to diagnose an outbreak of the malware 122, the CLDP applications 110a-110n and 116 may employ the CLDP methods disclosed herein to aggregate the perturbed ordinal data 114a-114n from only a relatively small number of the client devices 104a-104n infected by the malware 122, and yet the perturbing of the actual ordinal data 112a-112n can still be cancelled out, resulting in aggregate statistics that reduce noise sufficiently to be used in accurately estimating aggregate statistics and trends pertaining to the whole population of the client devices 104a-104n.

Further, unlike some LDP methods which cannot handle sequences of non-ordinal data values, the CLDP applications 110a-110n and 116 may be employed to collect sequences of non-ordinal data such as sequences of textual data. For example, when attempting to diagnose an outbreak of the malware 122, the CLDP applications 110a-110n and 116 may collect and analyze the sequences of events that occurred on the client devices 104a-104n just prior to infection or just after infection by the malware 122, even though the sequence of events that occurs on a client device is a sequence of non-ordinal data.

Thus, the CLDP applications 110a-110n and 116 may employ the CLDP methods disclosed herein to accurately diagnose an outbreak of the malware 122, resulting in the minimizing or preventing of damage to any of the client devices 104a-104n infected in the malware outbreak and/or the avoiding of infections of additional computers.

Modifications, additions, or omissions may be made to the system 100 without departing from the scope of the present disclosure. In some embodiments, the system 100 may include additional components similar to the components illustrated in FIG. 1 that each may be configured similarly to the components illustrated in FIG. 1.

Figure 2:
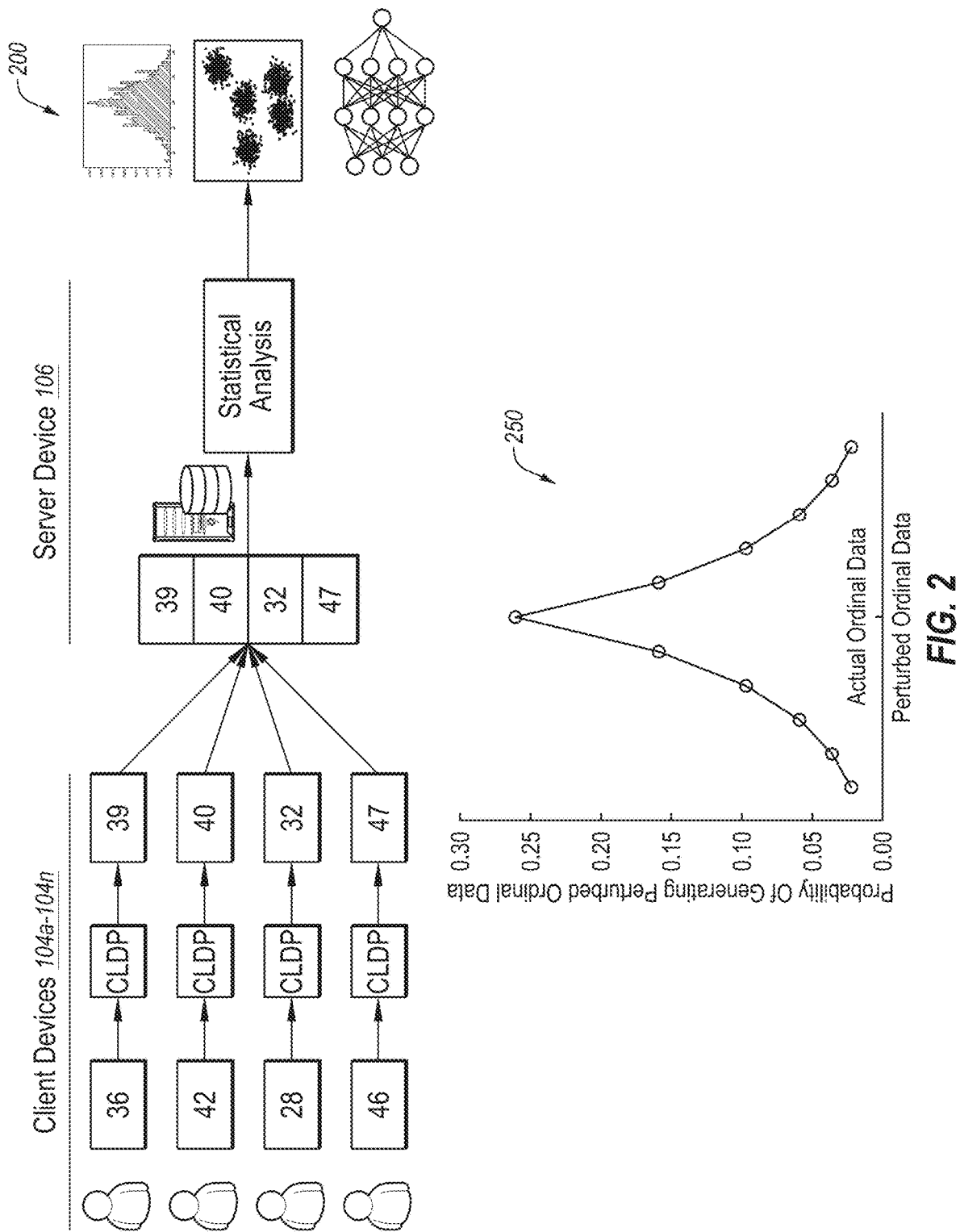
FIG. 2 is charts illustrating aspects of CLDP for ordinal data.

FIG. 2 is charts 200 and 250 illustrating aspects of CLDP for ordinal data. In particular, the chart 200 discloses that each of client devices 104a-104n may include actual ordinal data values (e.g., with data values 36, 42, 28, and 46) that the owner(s) of client devices 104a-104n would rather only share in a privacy-preserving matter. Therefore, instead of sharing the actual ordinal data, the client devices 104a-104n may first perturb the actual ordinal data value using CLDP into perturbed ordinal data values (e.g., with data values 39, 40, 32, and 47) by adding noise to the actual ordinal data values, before sending the perturbed ordinal data value to be aggregated by the server device 106. The aggregation of the perturbed ordinal data value may at least partially cancel out the noise at a population level that was added to the actual ordinal data, but the server device 106 may nevertheless be prevented from inferring the actual ordinal data of any of the client devices 104a-104n. The server device 106 may then perform an analysis of the aggregated perturbed ordinal data, such as a statistical analysis, in order to accurately estimate aggregate statistics and trends pertaining to the whole population of the client devices 104a-104n.

Further, the charts 200 and 250 disclose that the noise that the client devices 104a-104n add to the actual ordinal data values may be probabilistically computed with a probability of relatively less noise being added to the actual ordinal data being higher than a probability of relatively more noise being added to the actual ordinal data. Further, the noise added may be no noise (e.g. zero), positive noise, or negative noise. For example, as disclosed in the chart 250, the actual ordinal data value (represented by the center data value along the horizontal axis in the graph) may be perturbed to generate a perturbed ordinal data value (which may be any of the values along the horizontal axis in the graph) by adding noise to the actual ordinal data value. As disclosed in the graph in chart 250, the probability of relatively less noise being added to the actual ordinal data value is higher than a probability of relatively more noise being added to the actual ordinal data value. In some embodiments, the probability of generating a perturbed ordinal data value that is closer to the actual ordinal data value (e.g., with a relatively small amount of added noise) is higher than the probability of generating some other perturbed ordinal data value that is farther from the actual ordinal data value (e.g., with a relatively large amount of added noise). In some embodiments, noise is added to the actual ordinal data with a probability of noise being added decreasing (e.g., decreasing exponentially, or decreasing in a non-exponential way) as an amount of added noise increases.

In some embodiments, noise may be added to an actual ordinal data value v according to the following formula, where a CLDP mechanism M takes as input an actual ordinal value v and returns a perturbed ordinal data value y with probability:

$$Pr[M(v) = y] = \frac{e^{\frac{-\varepsilon \cdot d(v,y)}{2}}}{\sum_{z \in Range(M)} e^{\frac{-\varepsilon \cdot d(v,z)}{2}}}$$

which satisfies ε-CLDP, where ε, which is commonly referred to as the privacy budget, denotes the level of privacy protection offered by mechanism M (with lower values indicating higher protection), e is Euler's number, d(v, y) is a distance metric that returns the distance between data values v and y (e.g., the Euclidian distance), and Range(M) is a function that returns the set of all possible data values that can be taken as input by the CLDP mechanism M.

In some embodiments, an increasing probability employed in CLDP methods, such as that disclosed in the chart 250, may enable the collection of ordinal data in a privacy-preserving manner from relatively smaller populations than some LDP methods which employ a probability that is unchanging regardless of how much or how little noise (either positive or negative) is added to the actual ordinal value.

Modifications, additions, or omissions may be made to the charts 200 and 250 without departing from the scope of the present disclosure. In some embodiments, the charts 200 and 250 may include additional components similar to the components illustrated in FIG. 2 that each may be configured similarly to the components illustrated in FIG. 2.

Figure 3:
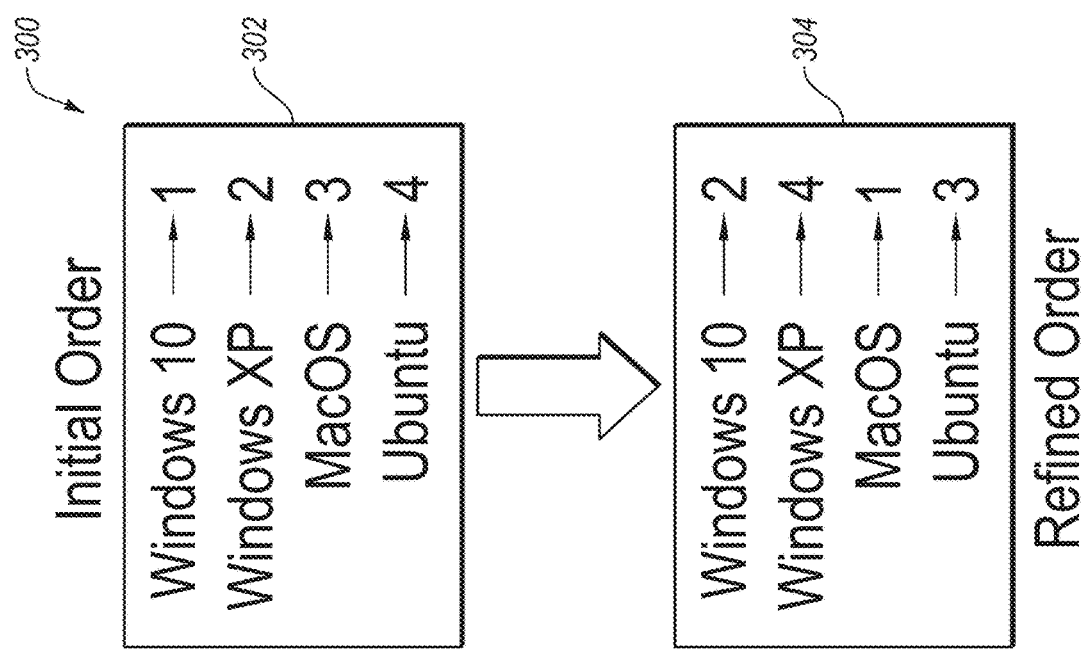
FIG. 3 is a chart illustrating aspects of CLDP for single non-ordinal data values.

FIG. 3 is a chart 300 illustrating aspects of CLDP for single non-ordinal data values. In particular, chart 300 discloses an initial ordering scheme 302 and a refined ordering scheme 304. The initial ordering scheme 302 may be generated to order non-ordinal data, such as textual names of operating systems (e.g., Windows 10, Windows XP, MacOS, and Ubuntu). It is understood that prior to the generation of the initial ordering scheme 302, the non-ordinal data may be mapped to ordinal data, and the ordinal data may be what is actually ordered in the initial ordering scheme 302. This mapping may be performed because it may be easier to compare ordinal data than it is to compare non-ordinal data. For example, ordinal data can be easily ordered along an x-axis in the chart 250 of FIG. 2, while it may be difficult or impossible to order non-ordinal data in this manner. Therefore, a mapping, such as the mapping 117 of FIG. 1, may enable non-ordinal data to be converted into ordinal data to be more easily perturbed, aggregated, and analyzed.

The order of the initial ordering scheme 302 may be a random order or a close to random order (e.g., an alphabetical order of textual data, a numeric order of hashes of mapped ordinal data, etc.). Later, the initial ordering scheme 302 may be refined, resulting in the refined ordering scheme 304, based on aggregated perturbed ordinal data, such as the aggregated perturbed ordinal data 118 of FIG. 1, by denoising and refining the aggregated perturbed ordinal data. The order of the refined ordering scheme 304 may be more desirable than the random or close to random order of the initial ordering scheme 302, such that the refined order may better reflect a logical ordering of the non-ordinal data. For example, where the non-ordinal data is textual names of operating systems, the refined ordering scheme 304 may reflect the order from greatest to least where the operating system with a ranking of 1 is the operating system executed by computer systems with the most malware infections, and the operating system with a ranking of 4 is the operating system executed by computer systems with the least malware infections. These ordering schemes may then be employed using the CLDP methods disclosed herein to rank a list of operating systems from most targeted to least targeted in a malware outbreak. In this example, as illustrated in FIG. 3, once the refined ordering scheme 304 is generated, it is apparent that computer systems executing the MacOS operating system are most likely to have been infected with a particular malware, and computer systems executing the Windows XP operating system are least likely to have been infected with a particular malware.

Modifications, additions, or omissions may be made to the chart 300 without departing from the scope of the present disclosure. In some embodiments, the chart 300 may include additional components similar to the components illustrated in FIG. 3 that each may be configured similarly to the components illustrated in FIG. 3. Further, the non-ordinal data disclosed in FIG. 3 is not limited to names of operating systems, but may be any other non-ordinal data including, but not limited to, files paths or system calls.

Figure 4:
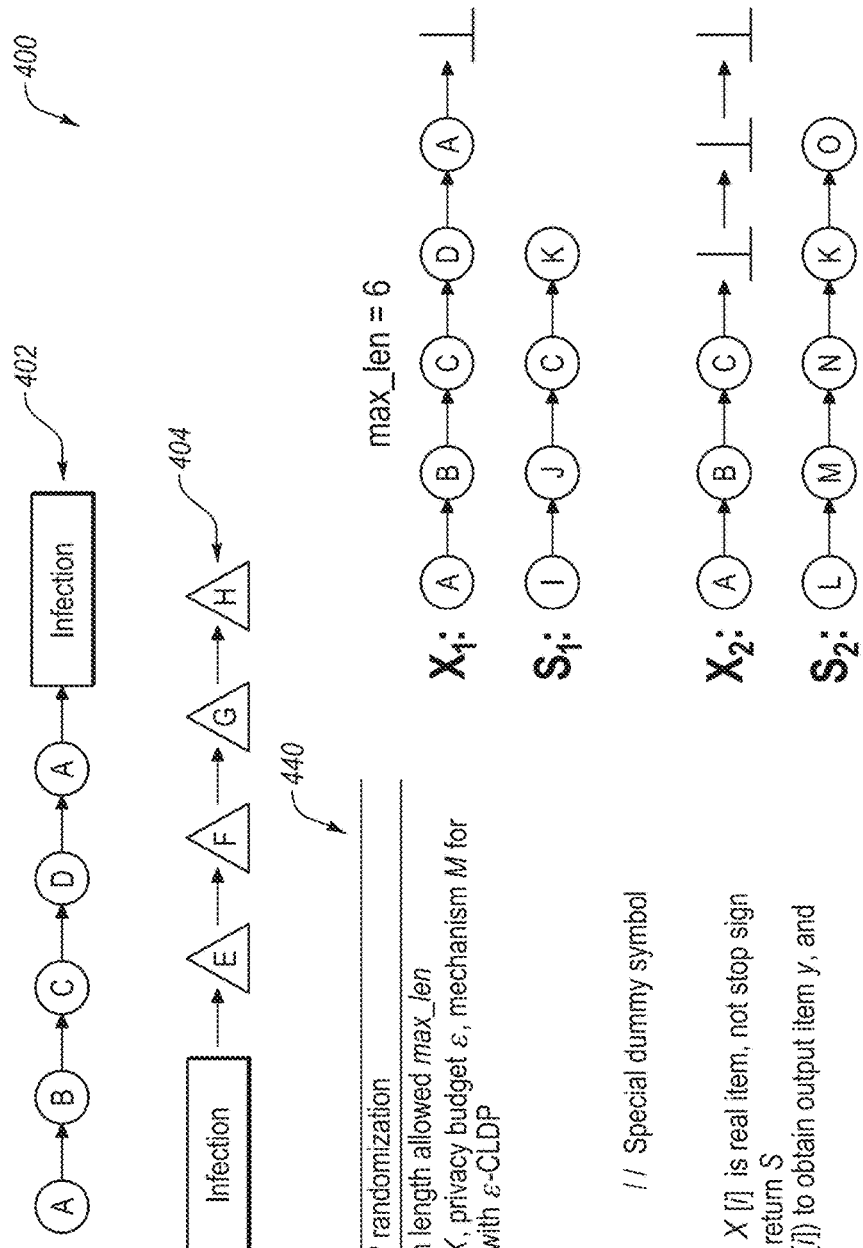
FIG. 4 is charts illustrating aspects of CLDP for sequences of non-ordinal data values.

FIG. 4 is charts 400 and 440 illustrating aspects of CLDP for sequences of non-ordinal data values. In particular, the chart 400 discloses a first sequence 402 of non-ordinal data values and a second sequence 404 of non-ordinal data values. In some embodiments, the first and second sequences 402 and 404 may represent sequences of events that occurred on a computer system just prior to infection and just after infection by a particular malware, respectively. For example, the first sequence 402 may represent events A, B, C, D, and A that occurred on the client device 104a of FIG. 1 just prior to infection by the malware 122 of FIG. 1. Similarly, the second sequence 404 may represent events E, F, G, and H that occurred on the client device 104n of FIG. 1 just after infection by the malware 122 of FIG. 1. Such sequences may be gathered in order to determine suspicious sequences of events happening on machines that are infected in a malware outbreak, and in order to determine which sequences could be precursors or consequences of an infection during the malware outbreak.

Further, the chart 440 disclosed a method for CLDP for sequences of non-ordinal data values. As disclosed in the chart 440, the method begins with various parameters and inputs, and generates a particular output. The method also loops through certain actions resulting in a perturbed sequence being generated from an actual sequence, using in part the method of CLDP for single non-ordinal data values as denoted by the CLDP mechanism M. For example, the perturbed sequence S1 may be generated from the actual sequence X1 using the method disclosed in the chart 440. Similarly, the perturbed sequence S2 may be generated from the actual sequence X2 using the method disclosed in the chart 440. In both examples, the perturbation may result not only in a different sequence, but also in a different length of the sequence, in the perturbed sequence. In this manner, both the values in the actual sequence, as well as number of values in the actual sequence, may be perturbed.

In some embodiments, the parameters of the method of the chart 440 may be implemented with a symmetric choice of p=q as follows:

$$p = q = \frac{1}{e^\varepsilon + 1}$$

where ε, which is commonly referred to as the privacy budget, denotes the level of privacy protection offered by the perturbation mechanism (with lower values indicating higher protection) and e is Euler's number.

Alternatively, in some embodiments, the parameters of the method of the chart 440 may be implemented with an asymmetric choice of p and q as follows:

$$0 < p < \frac{1}{e^\varepsilon + 1} \text{ and } 1 - e^\varepsilon \cdot p \leq q \leq 1 - \frac{p}{e^\varepsilon}$$

where ε and e are defined as above.

Modifications, additions, or omissions may be made to the charts 400 and 440 without departing from the scope of the present disclosure. In some embodiments, the charts 400 and 440 may include additional components similar to the components illustrated in FIG. 4 that each may be configured similarly to the components illustrated in FIG. 4. Further, the sequences of non-ordinal data disclosed in FIG. 4 are not limited to sequences of events that occurred on a computer system just prior to infection and just after infection by a particular malware, but may be sequences of any other non-ordinal data including, but not limited to, event sequences in a behavioral malware detection system or event sequences in an Endpoint Detection and Response (EDR) system.

Figure 5A:
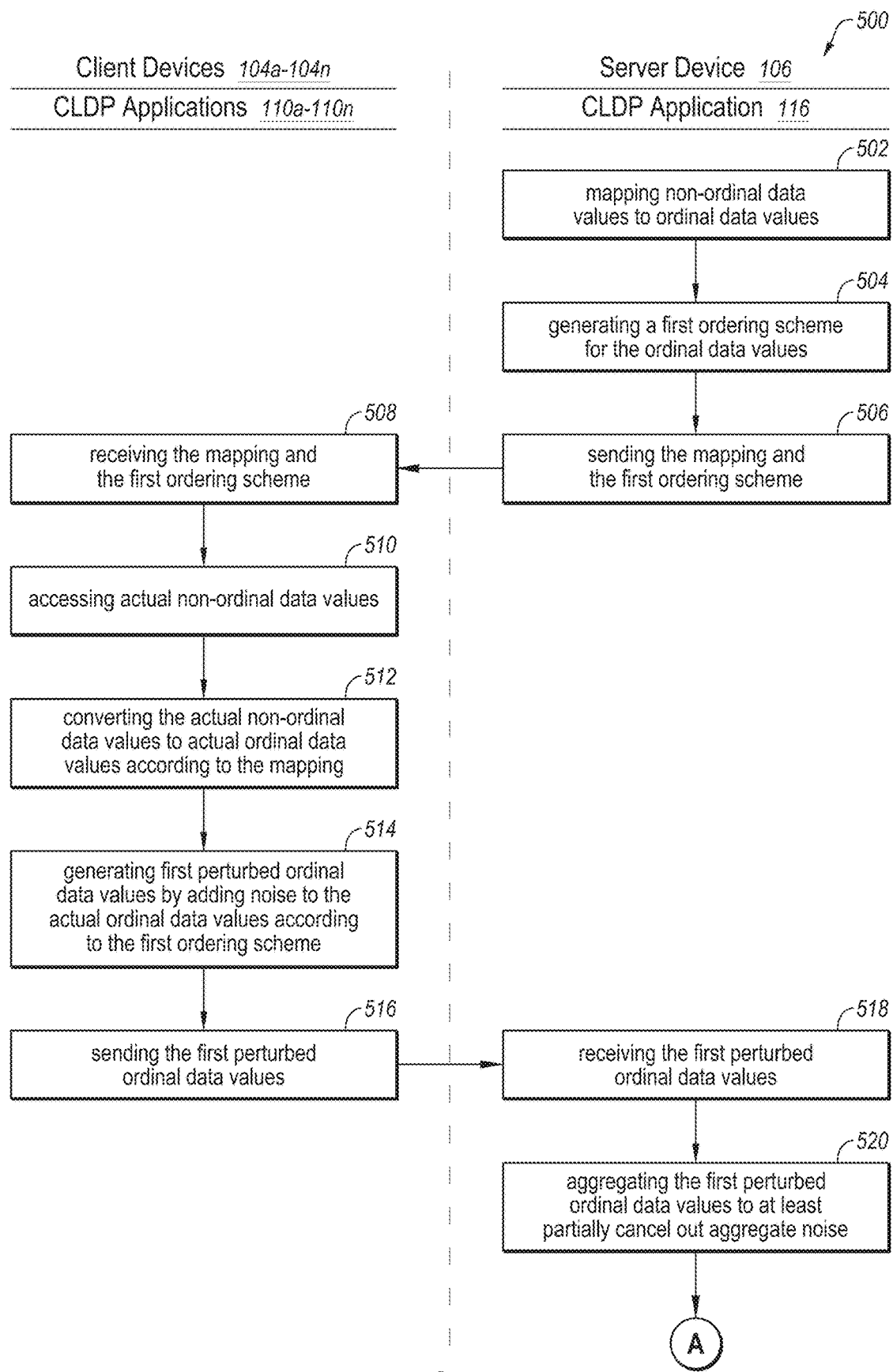
FIGS. 5A-5B are a flowchart of an example method for identifying and protecting against computer security threats, while preserving privacy of individual client devices, using CLDP for single non-ordinal data values or for sequences of non-ordinal data values.
Figure 5B:
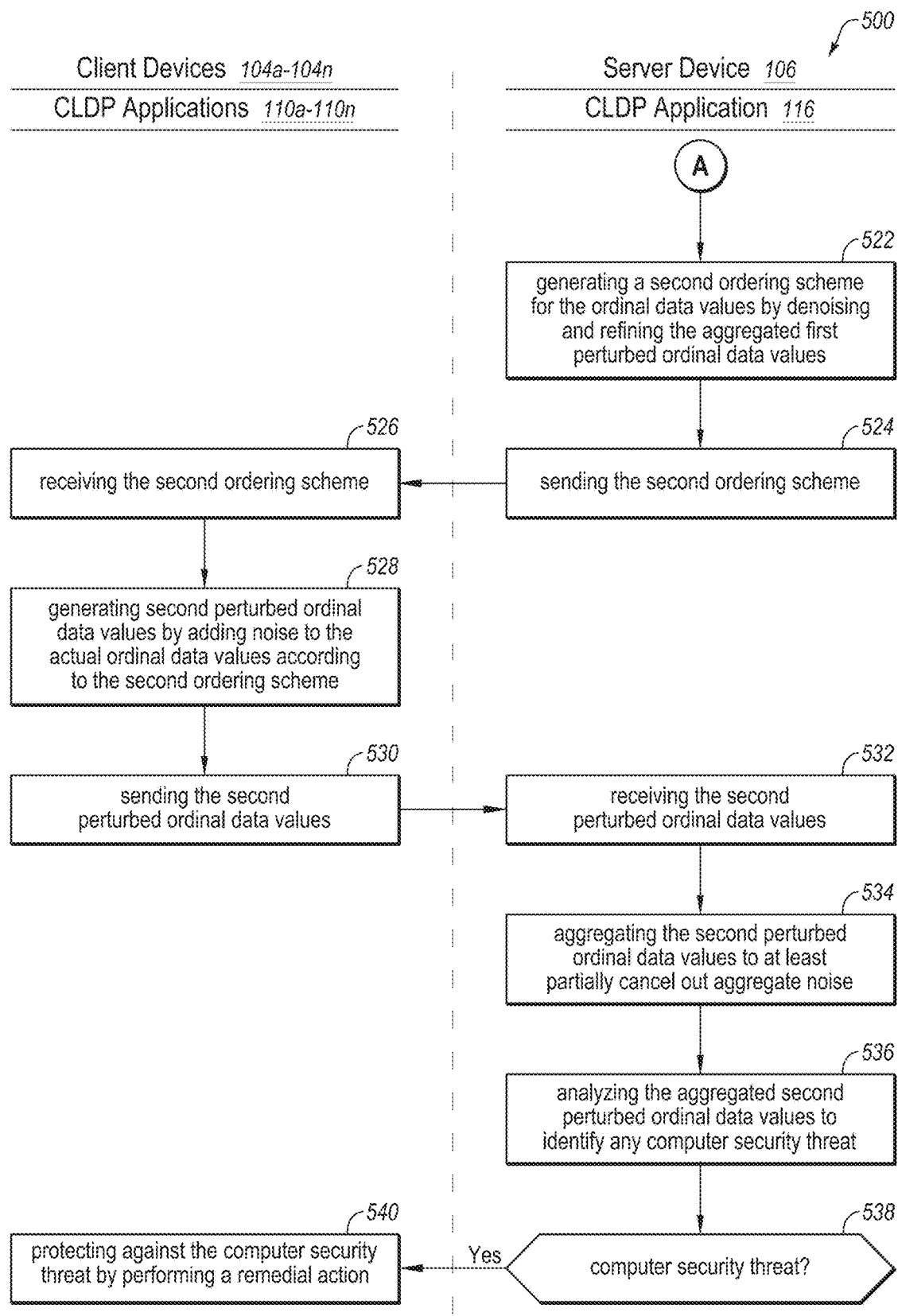

FIGS. 5A-5B are a flowchart of an example method 500 for identifying and protecting against computer security threats, while preserving privacy of individual client devices, using CLDP for single non-ordinal data values or for sequences of non-ordinal data values. The method 500 may be performed, in some embodiments, by one or more applications, devices, or systems, such as by the CLDP applications 110a-110n and 116 of FIG. 1, or some other application(s), or some combination thereof. In these and other embodiments, the method 500 may be performed by one or more processors based on one or more computer-readable instructions stored on one or more non-transitory computer-readable media. The method 500 will now be described in connection with FIGS. 1, 2, 3, 4, and 5A-5B.

The method 500 may include, at action 502, mapping non-ordinal data values to ordinal data values. For example, the CLDP application 116 may map, at action 502, non-ordinal data to ordinal data in the mapping 117.

The method 500 may include, at action 504, generating a first ordering scheme for the ordinal data values. For example, the CLDP application 116 may generate, at action 504, the initial ordering scheme 119 for the ordinal data, which may be the initial ordering scheme 302, which may have an order that is random or close to random.

The method 500 may include, at action 506, sending, and at action 508, receiving the mapping and the first ordering scheme. For example, the CLDP application 116 may send, at action 506, and the CLDP applications 110a-110n may receive, at action 508, the mapping 117 and the initial ordering scheme 119.

The method 500 may include, at action 510, accessing actual non-ordinal data values. In some embodiments, the actual non-ordinal data values may be related to a computer security threat, such as a malware outbreak. In these embodiments, the actual non-ordinal data values related to the malware outbreak may include names of the operating systems being executed on the local client devices. For example, the CLDP applications 110a-110n may access, at action 510, the actual non-ordinal data 111a-111n that may be related to an outbreak of the malware 122. In this example, the actual non-ordinal data 111a-111n may include names of the operating systems being executed on the client devices 104a-104n, as disclosed in the initial ordering scheme 302.

The method 500 may include, at action 512, converting the actual non-ordinal data values to actual ordinal data values according to the mapping. For example, the CLDP applications 110a-110n may convert, at action 512, the actual non-ordinal data 111a-111n to the actual ordinal data 112a-112n according to the mapping 117.

The method 500 may include, at action 514, generating first perturbed ordinal data values by adding noise to the actual ordinal data values according to the first ordering scheme. In some embodiments, the amount of noise being added, according to the first ordering scheme, to each actual data value may be probabilistically computed such that a probability of noise being added decreases as an amount of added noise increases. In some embodiments, the noise may be added to each actual ordinal data value with a probability of noise being added decreasing exponentially as an amount of added noise increases. In some embodiments, the adding of the noise to each actual ordinal data value may prevent the remote server device from inferring the name of the operating system being executed on any of the local client devices. For example, the CLDP applications 110a-110n may generate, at action 514, the perturbed ordinal data 114n by adding noise to the actual ordinal data 112a-112n according to the initial ordering scheme 119, with the noise being probabilistically computed such that a probability of noise being added decreases as an amount of added noise increases, for example as disclosed in the chart 250.

The method 500 may include, at action 516, sending, and at action 518, receiving, the first perturbed ordinal data values. For example, the CLDP applications 110a-110n may send, at action 516, and the CLDP application 116 may receive, at action 518, the perturbed ordinal data 114a-114n.

The method 500 may include, at action 520, aggregating the perturbed ordinal data to at least partially cancel out aggregate noise. In some embodiments, the aggregate noise may be at least partially cancelled out at a population level. For example, the CLDP application 116 may aggregate, at action 520, the perturbed ordinal data 114a-114n (which was received at action 518) into the aggregated perturbed ordinal data 118 to at least partially cancel out aggregate noise (which was added at action 514) at a population level.

In some embodiments, various actions of the method 500 may be substantially repeated to increase accuracy. For example, the method 500 may include actions 522-534, which are a substantial repeat of actions 504-508 and 514-520, with the main difference being that a second ordering scheme is employed instead of a first ordering scheme, which may cause the generating of the second perturbed ordinal data values at action 528 to be more accurate than the generating of the first perturbed ordinal data values at action 514. In other embodiments, actions 522-534 may be skipped, and the analysis at action 536 may be performed on the aggregated first perturbed ordinal data values instead of being performed on the aggregated second perturbed ordinal data values.

The method 500 may include, at action 522, generating a second ordering scheme for the ordinal data values by denoising and refining the aggregated first perturbed ordinal data values. For example, the CLDP application 116 may generate, at action 522, a refined ordering scheme 121 for the ordinal data, which may be the refined ordering scheme 304, by denoising and refining the aggregated perturbed ordinal data 118.

The method 500 may include, at action 524, sending, and at action 526, receiving the second ordering scheme. For example, the CLDP application 116 may send, at action 524, and the CLDP applications 110a-110n may receive, at action 526, the refined ordering scheme 121.

The method 500 may include, at action 528, generating second perturbed ordinal data values by adding noise to the actual ordinal data values according to the second ordering scheme. In some embodiments, the amount of noise being added, according to the second ordering scheme, to each actual data value may be probabilistically computed such that a probability of noise being added decreases as an amount of added noise increases. For example, the CLDP applications 110a-110n may generate, at action 528, the perturbed ordinal data 114n, for a second time, by adding noise to the actual ordinal data 112a-112n according to the refined ordering scheme 121, with the noise being probabilistically computed such that a probability of noise being added decreases as an amount of added noise increases, for example as disclosed in the chart 250.

The method 500 may include, at action 530, sending, and at action 532, receiving the second perturbed ordinal data values. For example, the CLDP applications 110a-110n may send, at action 530, and the CLDP application 116 may receive, at action 532, the perturbed ordinal data 114a-114n.

The method 500 may include, at action 534, aggregating the second perturbed ordinal data values to at least partially cancel out aggregate noise. In some embodiments, the aggregate noise may be at least partially cancelled out at a population level. For example, the CLDP application 116 may aggregate, at action 534, the perturbed ordinal data 114a-114n (which was received at action 532) into the aggregated perturbed ordinal data 118 to at least partially cancel out aggregate noise (which was added at action 528) at a population level.

The method 500 may include, at action 536, analyzing the aggregated second perturbed ordinal data values to identify any computer security threat. In some embodiments, the analyzing may be performed on the aggregated second perturbed ordinal data values after the aggregated second perturbed ordinal data values have been reverse-mapped to perturbed non-ordinal data values using the mapping. In some embodiments, where the computer security threat is a malware outbreak, the analyzing may include analyzing the aggregated second perturbed ordinal data values to identify a timing of a malware infecting the local client devices. For example, the CLDP application 116 may analyze, at action 536, the aggregated perturbed ordinal data 118 (perhaps after the aggregated perturbed ordinal data 118 has been reverse-mapped to perturbed non-ordinal data using the mapping 117) to identify any computer security threat, such as an outbreak of the malware 122, including identifying particular points in time when the client devices 104a-104n as a population were first infected, or as a population were infected again, with the malware 122. In this example, the CLDP application 116 may perform the analysis at action 536 of aggregated perturbed ordinal data 118 while preserving privacy of the actual ordinal data 112a-112n by preventing the server device 106 from inferring the actual ordinal data of any of the client devices (e.g., by preventing the server device 106 from inferring the actual ordinal data 112a of the client device 104a, or by preventing the server device 106 from inferring the actual ordinal data 112n of the client device 104n).

The method 500 may include, at action 538, determining whether there is a computer security threat. If so, the method 500 may include, at action 540, protecting against the computer security threat by performing a remedial action. In some embodiments, the performing of the remedial action at the one or more local client devices may include one or more of blocking the one or more local client devices from accessing a network, rolling back one or more changes at the one or more local client devices that were made in response to the computer security threat, or temporarily freezing activity at the one or more local client devices, or some combination thereof. For example, the CLDP application 116 may determine, at action 538, that a computer security threat such as an outbreak of the malware 122 has occurred (e.g. based on the analysis performed at action 536) and, in response, the CLDP application 116 may protect against the outbreak of the malware 122 by performing a remedial action. The remedial action may include, for example, blocking one or more of the client devices 104a-104n from accessing the network 102, rolling back one or more changes at one or more of the client devices 104a-104n that were made in response to the outbreak of the malware 122 (e.g., one or more changes made by the malware 122), or temporarily freezing activity at one or more of the client devices 104a-104n, or some combination thereof.

Further, in some embodiments, the method 500 may further include, at some point after the second ordering scheme is generated at action 522 and then received at the local client devices at action 526, additional actions related to CLDP for sequences of actual non-ordinal data values. For example, the method 500 may include accessing, at each of the local client devices, a sequence of actual non-ordinal data values. In these embodiments, the method 500 may also include generating, at each of the local client devices, a sequence of perturbed non-ordinal data values by adding noise to one or more of the actual data values in the sequence of actual non-ordinal data values. The amount of noise added, according to the mapping and the second ordering scheme, to each actual data value may be probabilistically computed such that a probability of noise being added decreases as an amount of added noise increases. In these embodiments, the method 500 may further include sending, from each of the local client devices, the sequence of perturbed non-ordinal data values to the remote server device. In these embodiments, the method 500 may also include aggregating, at the remote server device, the sequences of perturbed non-ordinal data values to at least partially cancel out aggregate noise of the aggregated sequences of perturbed non-ordinal data values at a population level. In these embodiments, the method 500 may further include analyzing, at the remote server device, using CLDP, the aggregated sequences of perturbed non-ordinal data values to identify a second computer security threat to the local client devices while preserving privacy of the sequences of actual non-ordinal data values by preventing the remote server device from inferring the sequence of actual non-ordinal data values, and an actual length of the sequence of actual non-ordinal data values, of any of the local client devices. In these embodiments, the method 500 may also include, in response to identifying the second computer security threat, protecting against the second computer security threat by performing, at one or more of the local client devices, a second remedial action to protect the one or more local client devices from the second computer security threat.

For example, after action 526, the CLDP applications 110a-110n may access, at each of the client devices 104a-104n, a sequence of actual non-ordinal data values (such as the sequence 402 or 404) and then generate, at each of the local client devices, a sequence of perturbed non-ordinal data values (such as the sequence S1 or S2) by adding noise to one or more of the actual data values in the sequence of actual non-ordinal data values, as illustrated in Algorithm 1 in FIG. 4. In this example, the amount of noise added, according to the mapping 117 and the refined ordering scheme 121, to each actual data value may be probabilistically computed such that a probability of noise being added decreases as an amount of added noise increases, for example as disclosed in the chart 250. In this example, the CLDP applications 110a-110n may send, and the CLDP application 116 may receive, the sequences of perturbed non-ordinal data values. In this example, the CLDP application 116 may then aggregate, at the server device 106, the sequences of perturbed non-ordinal data values to at least partially cancel out aggregate noise of the aggregated sequences of perturbed non-ordinal data values at a population level. In this example, the CLDP application 116 may then analyze, at the server device 106, using CLDP, the aggregated sequences of perturbed non-ordinal data values to identify an outbreak of the malware 122 on the local client devices 104a-104n, while preserving privacy of the sequences of actual non-ordinal data values by preventing the server device 106 from inferring the sequence of actual non-ordinal data values, and an actual length of the sequence of actual non-ordinal data values, of any of the client devices 104a-104n. In this example, in response to identifying the outbreak of the malware 122, the CLDP application 116 may protect against the outbreak of the malware 122 by performing a second remedial action.

In some embodiments, the method 500 may result in the identifying and protecting against an outbreak of the malware 122, while preserving privacy of the individual client devices 104a-104n, using CLDP for single non-ordinal data values or for sequences of non-ordinal data values. Unlike some LDP methods which require collecting data from relatively large populations (e.g., on the order of millions of client devices) to derive accurate insights, the method 500 may be employed on the relatively small population of the client devices 104a-104n (e.g., on the order of only thousands of client devices) and still derive accurate insights. For example, when attempting to diagnose an outbreak of the malware 122, the method 500 may aggregate the perturbed ordinal data 114a-114n from only a relatively small number of the client devices 104a-104n infected by the malware 122, and yet the perturbing of the actual ordinal data 112a-112n can still be cancelled out, resulting in aggregate statistics that reduce noise sufficiently to be used in accurately estimating aggregate statistics and trends pertaining to the whole population of the client devices 104a-104n.

Further, unlike some LDP methods which cannot handle sequences of non-ordinal data values, the method 500 may be employed to collect sequences of non-ordinal data such as sequences of non-ordinal data 111a-111n. For example, when attempting to diagnose an outbreak of the malware 122, the method 500 may collect and analyze the sequences of events that occurred on the client devices 104a-104n just prior to infection or just after infection by the malware 122, even though the sequence of events that occurs on a client device is a sequence of non-ordinal data.

Thus, the method 500 may accurately diagnose an outbreak of the malware 122, resulting in the minimizing or preventing of damage to any of the client devices 104a-104n infected in the malware outbreak and/or the avoiding of infections of additional computers.

Although the actions of the method 500 are illustrated in FIGS. 5A-5B as discrete actions, various actions may be divided into additional actions, combined into fewer actions, reordered, expanded, or eliminated, depending on the desired implementation. For example, in some embodiments, actions 502, 504, 510, 512, 514, and 520 may be performed without performing other actions of the method 500. Also, in some embodiments, actions 502, 504, 510, 512, 514, 520, 522, 528, and 534 may be performed without performing other actions of the method 500. Also, in some embodiments, actions 502, 504, 510, 512, 514, 520, 522, 528, 534, and 536 may be performed without performing other actions of the method 500, but action 536 may be performed to analyze the aggregated perturbed ordinal data to make a determination other than whether any computer security threat has occurred. Further, in some embodiments, any of action 536, action 538, or action 540 may be performed by a network administrator or other entity that is different from the entity or entities performing the other actions of the method 500.

Further, it is understood that the method 500 may improve the functioning of a network device itself, and improve the technical field of local differential privacy (LDP), such as where LDP is employed in identifying and protecting against a computer security threat such as a malware outbreak. For example, the functioning of the client devices 104a-104n and the server device 106 may themselves be improved by the method 500, by identifying and protecting against an outbreak of the malware 122, while preserving privacy of the individual client devices 104a-104n, using CLDP for single non-ordinal data values or for sequences of non-ordinal data values. Unlike some LDP methods which require collecting data from relatively large populations (e.g., on the order of millions of client devices) to derive accurate insights, the method 500 may be employed by the server device 106 on the relatively small population of the client devices 104a-104n (e.g., on the order of only thousands of client devices) and still derive accurate insights. Further, unlike some LDP methods which require collecting ordinal data, the method 500 may be employed to collect non-ordinal data such as textual data or sequences of textual data. Thus, the method 500 may accurately diagnose a computer security threat such as an outbreak of the malware 122, resulting in the minimizing or preventing of damage to any of the client devices 104a-104n infected in the malware outbreak and/or the avoiding of infections of additional computers.

FIG. 6 illustrates an example computer system 600 that may be employed in identifying and protecting against computer security threats, while preserving privacy of individual client devices, using CLDP for single non-ordinal data values or for sequences of non-ordinal data values. In some embodiments, the computer system 600 may be part of any of the systems or devices described in this disclosure. For example, the computer system 600 may be part of any of the client devices 104a-104n, the server device 106, or the malicious network device 108 of FIG. 1.

The computer system 600 may include a processor 602, a memory 604, a file system 606, a communication unit 608, an operating system 610, a user interface 612, and an application 614, which all may be communicatively coupled. In some embodiments, the computer system may be, for example, a desktop computer, a client computer, a server computer, a mobile phone, a laptop computer, a smartphone, a smartwatch, a tablet computer, a portable music player, or any other computer system.

Generally, the processor 602 may include any suitable special-purpose or general-purpose computer, computing entity, or processing device including various computer hardware or software applications and may be configured to execute instructions stored on any applicable computer-readable storage media. For example, the processor 602 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 602 may interpret and/or execute program instructions and/or process data stored in the memory 604 and/or the file system 606. In some embodiments, the processor 602 may fetch program instructions from the file system 606 and load the program instructions into the memory 604. After the program instructions are loaded into the memory 604, the processor 602 may execute the program instructions. In some embodiments, the instructions may include the processor 602 performing one or more actions of the method 500 of FIGS. 5A-5B.

The memory 604 and the file system 606 may include computer-readable storage media for carrying or having stored thereon computer-executable instructions or data structures. Such computer-readable storage media may be any available non-transitory media that may be accessed by a general-purpose or special-purpose computer, such as the processor 602. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 602 to perform a certain operation or group of operations, such as one or more actions of the method 500 of FIGS. 5A-5B. These computer-executable instructions may be included, for example, in the operating system 610, in one or more applications, such as in any of the CLDP applications 110*a*-110*n* or 116 or the malicious application 120 of FIG. 1, or in some combination thereof.

The communication unit 608 may include any component, device, system, or combination thereof configured to transmit or receive information over a network, such as the network 102 of FIG. 1. In some embodiments, the communication unit 608 may communicate with other devices at other locations, the same location, or even other components within the same system. For example, the communication unit 608 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 608 may permit data to be exchanged with a network and/or any other devices or systems, such as those described in the present disclosure.

The operating system 610 may be configured to manage hardware and software resources of the computer system 600 and configured to provide common services for the computer system 600.

The user interface 612 may include any device configured to allow a user to interface with the computer system 600. For example, the user interface 612 may include a display, such as an LCD, LED, or other display, that is configured to present video, text, application user interfaces, and other data as directed by the processor 602. The user interface 612 may further include a mouse, a track pad, a keyboard, a touchscreen, volume controls, other buttons, a speaker, a microphone, a camera, any peripheral device, or other input or output device. The user interface 612 may receive input from a user and provide the input to the processor 602. Similarly, the user interface 612 may present output to a user.

The application 614 may be one or more computer-readable instructions stored on one or more non-transitory computer-readable media, such as the memory 604 or the file system 606, that, when executed by the processor 602, is configured to perform one or more actions of the method 500 of FIGS. 5A-5B. In some embodiments, the application 614 may be part of the operating system 610 or may be part of an application of the computer system 600, or may be some combination thereof. In some embodiments, the application 614 may function as any of the CLDP applications 110*a*-110*n* or 116 or the malicious application 120 of FIG. 1.

Modifications, additions, or omissions may be made to the computer system 600 without departing from the scope of the present disclosure. For example, although each is illustrated as a single component in FIG. 6, any of the components 602-614 of the computer system 600 may include multiple similar components that function collectively and are communicatively coupled. Further, although illustrated as a single computer system, it is understood that the computer system 600 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 602 of FIG. 6) including various computer hardware or software applications, as discussed in greater detail below. Further, as indicated above, embodiments described herein may be implemented using computer-readable media (e.g., the memory 604 or file system 606 of FIG. 6) for carrying or having computer-executable instructions or data structures stored thereon.

In some embodiments, the different components and applications described herein may be implemented as objects or processes that execute on a computer system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for identifying and protecting against computer security threats while preserving privacy of individual client devices using condensed local differential privacy (CLDP), at least a portion of the method being performed by a computer device comprising at least one processor, the method comprising:

mapping, at a remote server device, non-ordinal data values to ordinal data values;

generating, at the remote server device, a first ordering scheme for the ordinal data values;

sending, to local client devices, the mapping and the first ordering scheme;

accessing, at each of the local client devices, an actual non-ordinal data value;

converting, at each of the local client devices, the actual non-ordinal data value to an actual ordinal data value according to the mapping;

generating, at each of the local client devices, a first perturbed ordinal data value by adding noise to the actual ordinal data value, an amount of noise being added, according to the first ordering scheme, to each actual data value being probabilistically computed such that a probability of noise being added decreases as an amount of added noise increases;

sending, from each of the local client devices, the first perturbed ordinal data value to the remote server device;

aggregating, at the remote server device, the first perturbed ordinal data values to at least partially cancel out aggregate noise of the aggregated first perturbed ordinal data values at a population level;

generating, at the remote server device, a second ordering scheme for the ordinal data values by denoising and refining the aggregated first perturbed ordinal data values;

sending, to local client devices, the second ordering scheme;

generating, at each of the local client devices, a second perturbed ordinal data value by adding noise to the actual ordinal data value, an amount of noise being added, according to the second ordering scheme, to each actual data value being probabilistically computed such that a probability of noise being added decreases as an amount of added noise increases;

sending, from each of the local client devices, the second perturbed ordinal data value to the remote server device;

aggregating, at the remote server device, the second perturbed ordinal data values to at least partially cancel out aggregate noise of the aggregated second perturbed ordinal data values at a population level;

analyzing, at the remote server device, using CLDP, the aggregated second perturbed ordinal data values to identify a computer security threat to the local client devices while preserving privacy of the actual data values by preventing the remote server device from inferring the actual data value of any of the local client devices; and in response to identifying the computer security threat, protecting against the computer security threat by performing, at one or more of the local client devices, a remedial action to protect the one or more local client devices from the computer security threat.

2. The method of claim 1, wherein the performing, at the one or more local client devices, of the remedial action comprises one or more of blocking the one or more local client devices from accessing a network, rolling back one or more changes at the one or more local client devices that were made in response to the computer security threat, or temporarily freezing activity at the one or more local client devices, or some combination thereof.

3. The method of claim 1, wherein the noise is added to each actual ordinal data value with a probability of noise being added decreasing exponentially as an amount of added noise increases.

4. The method of claim 1, wherein the computer security threat comprises a malware outbreak.

5. The method of claim 4, wherein:
the actual non-ordinal data values comprise names of operating systems being executed on the local client devices; and
the adding of the noise to the actual ordinal data values prevents the remote server device from inferring the name of the operating system being executed on any of the local client devices.

6. The method of claim 4, wherein the analyzing comprises analyzing, at the remote server device, using CLDP, the aggregated second perturbed ordinal data values to identify a timing of a malware infecting the local client devices.

7. The method of claim 1, further comprising:
accessing, at each of the local client devices, a sequence of actual non-ordinal data values;
generating, at each of the local client devices, a sequence of perturbed non-ordinal data values by adding noise to one or more of the actual data values in the sequence of actual non-ordinal data values, an amount of noise being added, according to the mapping and the second ordering scheme, to each actual data value being probabilistically computed such that a probability of noise being added decreases as an amount of added noise increases
sending, from each of the local client devices, the sequence of perturbed non-ordinal data values to the remote server device;
aggregating, at the remote server device, the sequences of perturbed non-ordinal data values to at least partially cancel out aggregate noise of the aggregated sequences of perturbed non-ordinal data values at a population level;
analyzing, at the remote server device, using CLDP, the aggregated sequences of perturbed non-ordinal data values to identify a second computer security threat to the local client devices while preserving privacy of the sequences of actual non-ordinal data values by preventing the remote server device from inferring the sequence of actual non-ordinal data values, and an actual length of the sequence of actual non-ordinal data values, of any of the local client devices; and in response to identifying the second computer security threat, protecting against the second computer security threat by performing, at one or more of the local client devices, a second remedial action to protect the one or more local client devices from the second computer security threat.

8. One or more non-transitory computer-readable media comprising one or more computer-readable instructions that, when executed by one or more processors of a computer device, cause the computer device to perform a method for identifying and protecting against computer security threats while preserving privacy of individual client devices using condensed local differential privacy (CLDP), the method comprising:
mapping, at a remote server device, non-ordinal data values to ordinal data values;
generating, at the remote server device, a first ordering scheme for the ordinal data values;
sending, to local client devices, the mapping and the first ordering scheme;
accessing, at each of the local client devices, an actual non-ordinal data value;
converting, at each of the local client devices, the actual non-ordinal data value to an actual ordinal data value according to the mapping;
generating, at each of the local client devices, a first perturbed ordinal data value by adding noise to the actual ordinal data value, an amount of noise being added, according to the first ordering scheme, to each actual data value being probabilistically computed such that a probability of noise being added decreases as an amount of added noise increases;
sending, from each of the local client devices, the first perturbed ordinal data value to the remote server device;
aggregating, at the remote server device, the first perturbed ordinal data values to at least partially cancel out aggregate noise of the aggregated first perturbed ordinal data values at a population level;
generating, at the remote server device, a second ordering scheme for the ordinal data values by denoising and refining the aggregated first perturbed ordinal data values;
sending, to local client devices, the second ordering scheme;
generating, at each of the local client devices, a second perturbed ordinal data value by adding noise to the actual ordinal data value, an amount of noise being added, according to the second ordering scheme, to each actual data value being probabilistically computed such that a probability of noise being added decreases as an amount of added noise increases;
sending, from each of the local client devices, the second perturbed ordinal data value to the remote server device;
aggregating, at the remote server device, the second perturbed ordinal data values to at least partially cancel out aggregate noise of the aggregated second perturbed ordinal data values at a population level;
analyzing, at the remote server device, using CLDP, the aggregated second perturbed ordinal data values to identify a computer security threat to the local client devices while preserving privacy of the actual data values by preventing the remote server device from inferring the actual data value of any of the local client devices; and in response to identifying the computer security threat, protecting against the computer security threat by performing, at one or more of the local client devices, a remedial action to protect the one or more local client devices from the computer security threat.

9. The one or more non-transitory computer-readable media of claim 8, wherein the performing, at the one or more local client devices, of the remedial action comprises one or more of blocking the one or more local client devices from accessing a network, rolling back one or more changes at the one or more local client devices that were made in response to the computer security threat, or temporarily freezing activity at the one or more local client devices, or some combination thereof.

10. The one or more non-transitory computer-readable media of claim 8, wherein the noise is added to each actual ordinal data value with a probability of noise being added decreasing exponentially as an amount of added noise increases.

11. The one or more non-transitory computer-readable media of claim 8, wherein the computer security threat comprises a malware outbreak.

12. The one or more non-transitory computer-readable media of claim 11, wherein:
the actual non-ordinal data values comprise names of operating systems being executed on the local client devices; and
the adding of the noise to the actual ordinal data values prevents the remote server device from inferring the name of the operating system being executed on any of the local client devices.

13. The one or more non-transitory computer-readable media of claim 11, wherein the analyzing comprises analyzing, at the remote server device, using CLDP, the aggregated second perturbed ordinal data values to identify a timing of a malware infecting the local client devices.

14. The one or more non-transitory computer-readable media of claim 8, wherein the method further comprises:
accessing, at each of the local client devices, a sequence of actual non-ordinal data values;
generating, at each of the local client devices, a sequence of perturbed non-ordinal data values by adding noise to one or more of the actual data values in the sequence of actual non-ordinal data values, an amount of noise being added, according to the mapping and the second ordering scheme, to each actual data value being probabilistically computed such that a probability of noise being added decreases as an amount of added noise increases
sending, from each of the local client devices, the sequence of perturbed non-ordinal data values to the remote server device;
aggregating, at the remote server device, the sequences of perturbed non-ordinal data values to at least partially cancel out aggregate noise of the aggregated sequences of perturbed non-ordinal data values at a population level;
analyzing, at the remote server device, using CLDP, the aggregated sequences of perturbed non-ordinal data values to identify a second computer security threat to the local client devices while preserving privacy of the sequences of actual non-ordinal data values by preventing the remote server device from inferring the sequence of actual non-ordinal data values, and an actual length of the sequence of actual non-ordinal data values, of any of the local client devices; and in response to identifying the second computer security threat, protecting against the second computer security threat by performing, at one or more of the local client devices, a second remedial action to protect the one or more local client devices from the second computer security threat.

15. A remote server device comprising:
one or more processors; and
one or more non-transitory computer-readable media comprising one or more computer-readable instructions that, when executed by the one or more processors, cause the remote server device to perform a method for identifying and protecting against computer security threats while preserving privacy of individual client devices using condensed local differential privacy (CLDP), the method comprising:
mapping, at the remote server device, non-ordinal data values to ordinal data values;
generating, at the remote server device, a first ordering scheme for the ordinal data values;
sending, to local client devices, the mapping and the first ordering scheme;
receiving, at the remote server device from local client devices, first perturbed ordinal data values, the first perturbed ordinal data values resulting from actual non-ordinal data values being accessed, the actual non-ordinal data values being converted to actual ordinal data values according to the mapping, and the first perturbed ordinal data values being generated at the local client devices by adding noise to the actual ordinal data values, the noise being added, according to the first ordering scheme, to each actual data value being probabilistically computed such that a probability of noise being added decreases as an amount of added noise increases;
aggregating, at the remote server device, the first perturbed ordinal data values to at least partially cancel out aggregate noise of the aggregated first perturbed ordinal data values at a population level;
generating, at the remote server device, a second ordering scheme for the ordinal data values by denoising and refining the aggregated first perturbed ordinal data values;
sending, to local client devices, the second ordering scheme;
receiving, at the remote server device from local client devices, second perturbed ordinal data values, the second perturbed ordinal data values resulting from actual non-ordinal data values being accessed, the actual non-ordinal data values being converted to actual ordinal data values according to the mapping, and the first perturbed ordinal data values being generated at the local client devices by adding noise to the actual ordinal data values, the noise being added, according to the second ordering scheme, to each actual data value being probabilistically computed such that a probability of noise being added decreases as an amount of added noise increases;
aggregating, at the remote server device, the second perturbed ordinal data values to at least partially cancel out aggregate noise of the aggregated second perturbed ordinal data values at a population level;
analyzing, at the remote server device, using CLDP, the aggregated second perturbed ordinal data values to identify a computer security threat to the local client devices while preserving privacy of the actual data values by preventing the remote server device from inferring the actual data value of any of the local client devices; and in response to identifying the computer security threat, protecting against the computer security threat by performing, at one or more of the local client devices, a remedial action to protect the one or more local client devices from the computer security threat.

16. The remote server device of claim 15, wherein the performing, at the one or more local client devices, of the remedial action comprises one or more of blocking the one or more local client devices from accessing a network, rolling back one or more changes at the one or more local client devices that were made in response to the computer security threat, or temporarily freezing activity at the one or more local client devices, or some combination thereof.

17. The remote server device of claim 15, wherein the noise is added to each actual ordinal data value with a probability of noise being added decreasing exponentially as an amount of added noise increases.

18. The remote server device of claim 15, wherein:
the computer security threat comprises a malware outbreak;
the actual non-ordinal data values comprise names of operating systems being executed on the local client devices; and
the adding of the noise to the actual ordinal data values prevents the remote server device from inferring the name of the operating system being executed on any of the local client devices.

19. The remote server device of claim 15, wherein:
the computer security threat comprises a malware outbreak; and
the analyzing comprises analyzing, at the remote server device, using CLDP, the aggregated second perturbed ordinal data values to identify a timing of a malware infecting the local client devices.

20. The remote server device of claim 15, wherein the method further comprises:
accessing, at each of the local client devices, a sequence of actual non-ordinal data values;
generating, at each of the local client devices, a sequence of perturbed non-ordinal data values by adding noise to one or more of the actual data values in the sequence of actual non-ordinal data values, an amount of noise being added, according to the mapping and the second ordering scheme, to each actual data value being probabilistically computed such that a probability of noise being added decreases as an amount of added noise increases
sending, from each of the local client devices, the sequence of perturbed non-ordinal data values to the remote server device;
aggregating, at the remote server device, the sequences of perturbed non-ordinal data values to at least partially cancel out aggregate noise of the aggregated sequences of perturbed non-ordinal data values at a population level;
analyzing, at the remote server device, using CLDP, the aggregated sequences of perturbed non-ordinal data values to identify a second computer security threat to the local client devices while preserving privacy of the sequences of actual non-ordinal data values by preventing the remote server device from inferring the sequence of actual non-ordinal data values, and an actual length of the sequence of actual non-ordinal data values, of any of the local client devices; and
in response to identifying the second computer security threat, protecting against the second computer security threat by performing, at one or more of the local client devices, a second remedial action to protect the one or more local client devices from the second computer security threat.

\* \* \* \* \*